Aug. 15, 1967     C. C. FAY     3,335,570
HYDRAULIC BRAKE EQUALIZER
Original Filed July 13, 1964     2 Sheets-Sheet 1
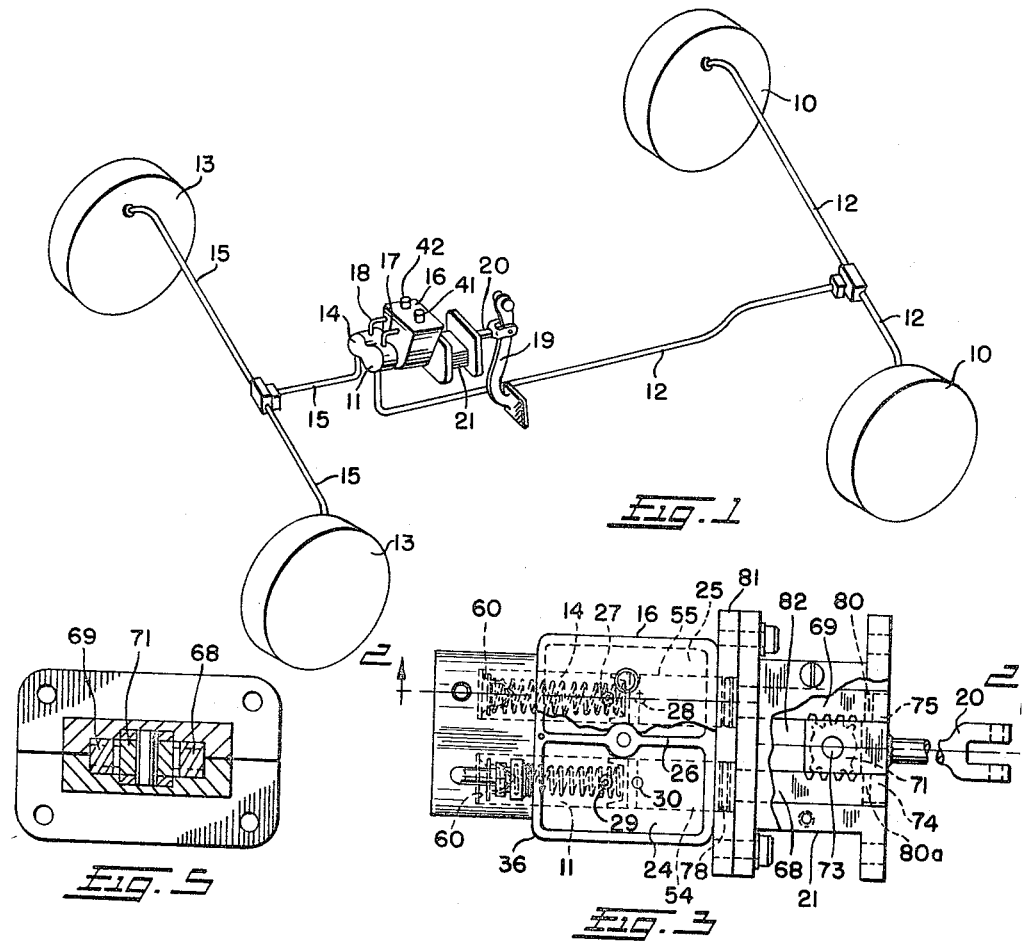
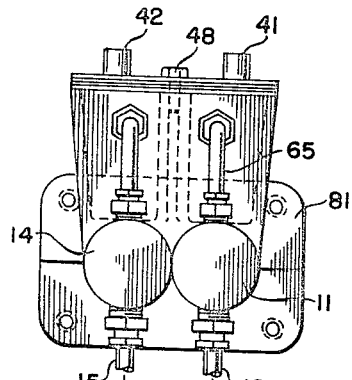
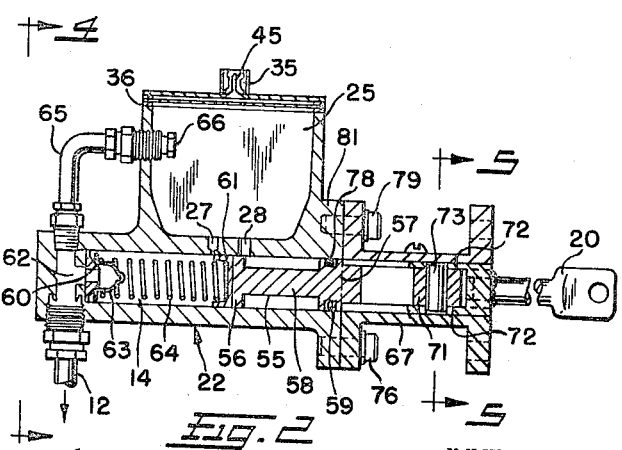
INVENTOR.
CLARENCE C. FAY
BY
*Schramm, Kramer & Sturges*
ATTORNEYS Aug. 15, 1967  C. C. FAY  3,335,570
HYDRAULIC BRAKE EQUALIZER
Original Filed July 13, 1964  2 Sheets-Sheet 2
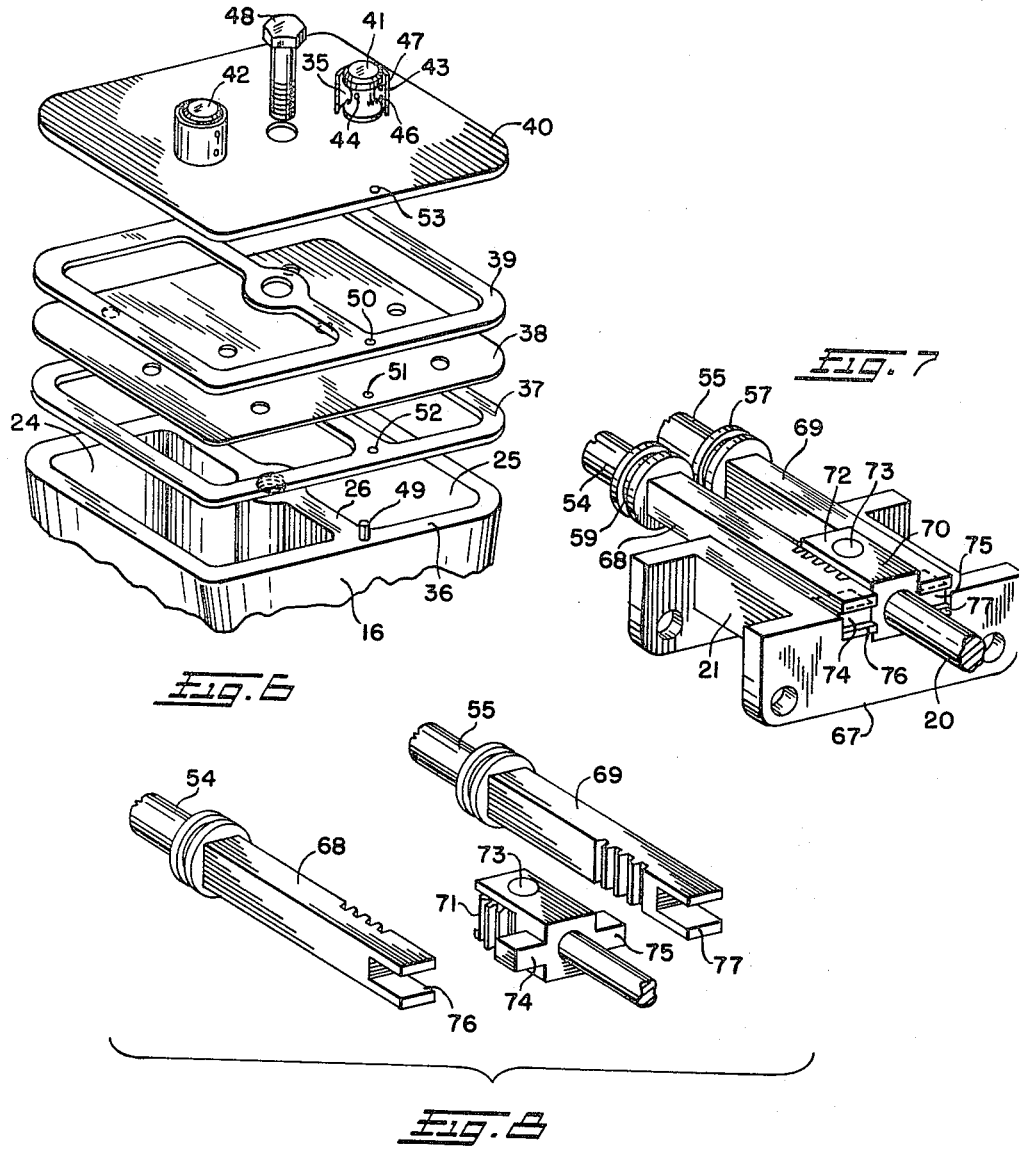
INVENTOR.
CLARENCE C. FAY
BY
Schramm, Kramer & Sturgeon
ATTORNEYS

United States Patent Office 3,335,570
Patented Aug. 15, 1967

3,335,570
HYDRAULIC BRAKE EQUALIZER
Clarence C. Fay, 17211 Edgewater Drive,
Lakewood, Ohio 44107
Continuation of application Ser. No. 382,229, July 13, 1964. This application Sept. 12, 1966, Ser. No. 584,033
17 Claims. (Cl. 60—54.5)

This application is a continuation of application Ser. No. 382,229 filed July 13, 1964, now abandoned.

This invention relates to hydraulically operated systems and more particularly to hydraulic plural isolated systems operated by a single manual or pedal operator and means for equalizing the force applied to each of such systems. This invention will be described in relation to a dual hydraulic braking system particularly useful in automotive vehicles, e.g. trucks, cars, etc. it being understood, however, that this invention is applicable in any hydraulically operated mechanism, which employes plural hydraulic control systems, e.g. hydraulic earth mover controls.

In automotive vehicles the front and rear brakes are more frequently being controlled by two separate hydraulic sub-systems, each sub-system having its own master cylinder, and both being actuated by a single pedal operator. The master cylinders are in communication with a fluid reservoir which provides fluid to the master cylinders. Pistons, within the cylinders, are driven by the brake pedal, and transmit, by hydraulic means, fluid under pressure sufficient to operate auxiliary brake cylinders located at each wheel to force the brake shoes or plates against a rotating drum or disc, as the case may be. In such hydraulic systems including plural hydraulic sub-systems driven from a single operator, e.g. a brake pedal, it is desirable to provide means for equalizing the force applied to each separate hydraulic sub-system. Unequal fluid pressure, or piston movement is caused for example, by uneven wear or adjustment of brake shoes or plates, a slight leak in the line, difference in friction losses in the lines, improper sealing about the pistons. In some automotive vehicles, the front wheel cylinder bore is greater than the rear wheel cylinder bore, requiring a larger fluid volume to actuate the front cylinders. Unless compensated for these and similar conditions cause uneven hydraulic action. The present invention provides, therefore, improved equalizing means adapted to respond to differences in resistance offered by the separate hydraulic systems to compensate for such differences and yield more nearly equal braking action at the wheels governed by each such system. Should there be a rupture in a hydraulic line in one of the hydraulic sub-systems, the present invention may be embodied in a device including a safety take-over structure hereinafter more particularly described, and operating to bypass the equalizing means to insure positive action of at least one set of brakes.

It has also been found that there is realized in the structures hereof a mechanical advantage because of the relationship of the equalizing driving system to the pistons in the master cylinders such that smaller master pistons than ordinarily required may be employed without loss of pedal travel to effect the same or greater force at the wheel cylinders.

This invention may also be embodied in devices including a divided reservoir with an improved air chamber structure hereinafter described, which provides a separate fluid source for each cylinder. With the conventional single compartment reservoir, the fluid would be completely drained from the system if, for example one of the brake lines was to rupture. Separate reservoirs provide greater protection in that fluid would still be available in one set of brakes even if one line were ruptured.

In accordance with this invention, differential movement of the pistons relative to each other is accomplished by providing slidable racks abutting each piston for imparting axial movement thereto. The racks have teeth or other suitable engaging means in their confronting surfaces for engagement with a pinion or engaging member rotatably mounted on an intermediately disposed plunger which is actuated by the brake pedal through a piton or brake rod. As the brake pedal is depressed, the plunger or carrier moves toward the master cylinders in a fluid pressurizing direction. The pinion on the carrier, being engaged with the teeth of the racks, moves the racks against the pistons forcing the pistons to exert pressure on the fluid. So long as there is equal pressure in the cylinders the racks will move in unison. However, should there be a differential in the pressures in the master cylinders, the pinion gear will allow the rack abutting the piston in the cylinder wherein the fluid pressure is less to move relative to the other rack. This movement is limited and will compensate for any small pressure differential. Because of the multiplier effect of the dual rack single pinion system, the amount of pedal required to bring about equalization is very small.

Also provided on the carrier are safety stops or lugs which are adapted to coact with the ends of the racks should there be any substantial pressure differential e.g. such as caused by a ruptured hydraulic line in one of the hydraulic sub-systems. The stops are a predetermined spaced distance from the rack ends e.g. 1/16″ to 1/8″ and should substantial pressure differences occur, the stop would positively engage the end of the rack abutting the piston movable in the cylinder wherein there is greater pressure, to directly drive the piston and abutting rack forward so that there will always be available positive braking action in the system having greater resistance or fluid pressure. In a device for operating dual master cylinders in a commercial automobile the space between the take-over lugs and the receiving shoulders of the dual confrontaing racks is about .062″. Thus within this short distance effective equalizing can be accomplished when each master cylinder is offering hydraulic resistance to piston movement, and if hydraulic resistance in one is lost due to line rupture, for example, the amount of pedal travel necessary to cause take-over and direct drive of the remaining piston is very slight.

This invention may also be embodied in a device including a novel method for bleeding air from the brake systems. A bleeder is connected to each line adjacent the cylinder and is connected, at its other extremity to the reservoir atop the cylinder.

To the accomplishment of the foregoing and related ends, said invention, then, consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

In the annexed drawings:

FIG. 1 is a perspective diagramamtic view showing a dual hydraulic braking system suitable for use in an automobile.

FIG. 2 is a cross-sectional view of an embodiment of this invention taken in the plane indicated by the line 2—2 of FIG. 3, and showing details of a master cylinder for one of a pair of hydraulic systems including the equalizing means hereof, and also showing the novel air bleeding system, the improved reservoir closure means and breathing means, and FIG. 3 is a partially cut away top plan view of the embodiment of the invention shown in FIG. 2, showing the divided fluid reservoir, the dual master cylinders, and the equalizing means hereof.

FIG. 4 is an end view of said embodiment as seen from the plane indicated by the line 4—4 of FIG. 2, showing the dual master cylinders and improved air bleeding lines.

FIG. 5 is a cross-sectional view of said embodiment taken in the plane indicated by the line 5—5 of FIG. 2.

FIG. 6 is an exploded isometric drawing of the top portion of the reservoir and showing the means for providing suitable air space above the fluid, spurt baffle means, and air breathing means.

FIG. 7 is an isometric illustration showing details of the hydraulic brake equalizer of FIG. 2.

FIG. 8 is an exploded isometric drawing showing the racks, pinion safety lugs and fragmentarily, the pistons of the master cylinders in more detail.

Briefly, the present invention is in a hydraulic fluid system having a plurality of isolated hydraulic sub-system each including a master cylinder and at least one auxiliary cylinder, hydraulic fluid supply means for supplying each of said hydraulic sub-systems, and a piston coacting in each said master cylinder for feeding fluid from said supply means into each of said sub-systems. This invention provides in such a system means for driving each of the pistons in a fluid pressurizing direction including a single force applying control member, which may, in turn, be operated manually, as by a foot pedal. Also included are driving racks coacting with each of the pistons in the master cylinders and a rotatable pinion coacting between said racks and said control member for differentially driving said racks in a fluid pressurizing direction in response to the resistance offered by each piston whereby the fluid pressure in each master cylinder is substantially equalized. In a preferred embodiment, the control member also includes non-rotatable take-over means for directly engaging the racks. The take-over means are activated only to drive the higher pressure piston when the resistance offered by another piston falls below a predetermined resistance value, e.g. the value of the fluid resistance in a hydraulic sub-system which includes a ruptured hydraulic line open to the atmosphere, for example.

In its more specific aspects, this invention is in a hydraulic brake equalizer useful in a plural hydraulic braking system. In accordance with one such more specific embodiment of this invention there is provided a pair of cylinders in parallel spaced relation and lying substantially in the same plane. Mounted atop each master cylinder is a reservoir communicating therewith, and having at its extremity opposite the cylinders an air chamber with breathing means for supplying air thereto. A piston is provided in each cylinder and is biased against a spring tending to move the piston in a fluid pressure relieving direction. Abutting each cylinder is a rack having teeth therein, the teeth being disposed in confronting surfaces of the racks. The racks are slidable along the longitudinal axis of the pistons. Mounted on a carrier slidable between the racks in substantially the same plane as the racks, is a pinion coacting between the teeth of the racks for differentially moving the racks in a fluid pressurizing direction in abutting relation with the pistons, whereby the pistons are moved in their respective cylinders, against the return spring biasing. Also provided are safety stops or lugs, for coaction with the racks to move them against the abutting cylinders when a substantial pressure difference occurs in the cylinders, and means for carrying fluid to the individual brake assemblies as well as means for bleeding air from the master cylinders.

Referring more particularly to FIG. 1 there is shown a pair of similar rear brake assemblies 10 connected to a separate master brake cylinder 11 by a brake line 12 and defining one hydraulic sub-system. Similarly a pair of front brake assemblies 13 are connected to a separate master brake cylinder 14 by brake lines 15 to define a second hydraulic sub-system. Mounted to and integral with the cylinders 11 and 14, is a divided hydraulic fluid reservoir indicated at 16. The bleeder lines between the master cylinders 11 and 14 and their respective reservoirs are indicated at 17 and 18. The pistons in the cylinders 11 and 14 are controlled by the movement of the brake pedal 19 which is pivotally secured to the brake rod 20, which is in turn drivingly socketed to the hydraulic brake equalizer generally indicated at 21.

Referring more particularly to FIGS. 2–5 there is shown a unitary cylinder and reservoir structure generally indicated at 22. The unitary structure 22 is preferably comprised of a pair of adjacent cylinders 11 and 14 which are substantially in the same plane and have mounted thereon and in communication therewith, reservoir generally indicated at 16. The reservoir 16 is preferably divided into two reservoirs or compartments 24 and 25 by a divided plate 26. The reservoir 25 is connected to the cylinder 14 by ports 27 and 28, and the reservoir 24 is connected to the cylinder 11 by ports 29 and 30 (FIG. 3). The fluid ports, for example, fluid ports 27 and 28, are more readily seen in FIG. 2. The upper extremity 36 of the reservoir 16 furtherest from the cylinders is open to the atmosphere to allow normal breathing due to fluctuation in liquid level within the reservoir 16.

As more readily seen in FIG. 6, a plurality of alternately disposed gaskets and metal plates secured to the open extremity of the reservoir 16 and sealing it, provide a novel air chamber. A pliable gasket 37 conforming to the configuration of the divided reservoir 16 is placed atop the extremity 36. Atop that is placed a baffle plate 38, which has therein a plurality of predetermined spaced holes extending therethrough. These holes are disposed as to not be vertically aligned with the ports 27 and 28, and 29 and 30 which extend into the cylinders 14 and 11, respectively. The initial piston movement necessary in closing fluid compensating ports 27 and 29 in cylinders 14 and 11 respectively, causes spouting of fluid through ports 27 and 29, and if the breather ports were in vertical alignment therewith, hydraulic fluid would be lost. Atop plate 38 is placed another pliable gasket 39 similar in configuration to gasket 37. Atop this is placed a cap plate 40. The plate 38 and cap 40 are held in spaced relation by the gasket 39 to form the air chamber.

Extending from the upper cap 40 are two breathers 41 and 42 which permit venting of air to chambers atop each reservoir. As seen in FIGS. 2 and 6, the breather 41 is substantially cylindrical, having its extremities belled out giving the center portion a smaller diameter. A sleeve 43 is wrapped around the breather 41. The sleeve 43 contacts the belled extremities of the breathers, but leaves an annular space around the center portion, for example, space 35 of breather 44. An air passage 44 is located in the center portion of the breather 41, and communicates with an inner passageway 45, as best seen in FIG. 2, which extends down through the plate 40 into the air chamber. A plurality of holes are disposed in the sleeve adjacent the annular spaces on the opposite side of the breathers, for example, holes 46 and 47 in sleeve 43 around breather 41. The holes are so spaced as to provide a baffle to keep foreign matter from entering the vent port 44. The breather 42 through which air is supplied to the other air chamber, is similarly constructed. The alternately disposed plates and gaskets are secured to the top of the reservoir by any suitable fastening means, e.g. bolt 48. The gaskets and baffles are further aligned with each other by an outstanding aligning pin 49, which is secured to the upper extremity 36 of reservoir 16 and which is designed to extend up through hole 52 in the lower gasket 37, hole 51 in the baffle plate 38, and hole 50 in the upper gasket 39 up into hole 53 in the upper plate 40.

Slidable in cylinders 11 and 14, are spring biased pistons 54 and 55, respectively. Since both pistons and cylinders are preferably alike, the following description will be in reference to piston 55 in cylinder 14. In the preferred embodiment of the invention the piston 55 has heads 56 and 57 separated by a cylindrical center 58 of smaller diameter. As seen in FIG. 2 the head 57 has a circumferential recess 59, wherein a pliable sealer ring 78 such as an O-ring is seated. Secured to the other piston head 56, is a resilient cup portion 61. Located in the cylinder end opposite the cup portion 61 is a fluid passage 62, to which a brake line 12 is secured. The brake line 12 permits fluid to be pumped into the rear brake assembly 10. A similar brake line would connect the other cylinder 14 with the front brake assembly 13. A conventionally designed check valve 63 covers the fluid outlet port 62, and permits fluid to be pumped through the outlet into the brake line 12. The check valve 63 is disposed in a helix spring 64 which extends into the resilent cup 61. The spring 64 biases the piston 55 in a fluid pressure relieving direction within the cylinder 14, while holding the check valve 63 over the fluid outlet port 62. It should be noted that the circular opening of the check valve 63 is seated on a resilient frusto-conically shaped valve seat 60 which is apertured to permit flow of fluid therethrough. The circular opening of the valve 63 coacts with valve seat 60 so that proper seating is always obtained even though the axis of the valve 63 should become tilted with respect to the axis of the cylinder 14.

Communicating with the fluid port 62 is a bleeder or by-pass tube 65 which has its other extremity connected to the reservoir 25. The tube 65 in the reservoir 25 includes a valve 66, which may be disposed within the reservoir 25 or in the line 65. By opening the valve 66 and reciprocating the piston 55 in the cylinder 14 with the foot pedal, air is bled from the cylinder 14 into the reservoir 25 out through the fluid into the atmosphere. Air is similarly bled from cylinder 11. Such smaller volume of air as may be trapped in the lines, e.g line 12 and 15 is easily removed in the conventional manner through the wheel cylinders. This system makes it unnecessary to discharge the large initial volume of cylinder-trapped air through the wheel cylinders.

Another advantage of this system is readily seen from the following example. It is standard practice in the trucking industry to render the front wheel brakes of trucks inoperative during icy road conditions. This is especially true with larger trucks where "grabbing" of the front wheel brakes may cause the truck to "jackknife." By opening bleeder valve 66 in the bled line 65 the front wheel brakes become inoperative, as fluid, pumped into this line would be recirculated back into the reservoir, and no braking action would occur.

A brake equalizer slide-way 67, best seen in FIGS. 7 and 8, in which the racks 68 and 69 and the carrier 70 are slidable, is secured to the rear plate 81 of the housing 22 by any suitable fastening means, e.g. bolts 76 and 79. The slideway 67 is so aligned with the housing 22, that when the racks are placed in their respective slides in the slide-way, the longitudinal axes of the cylinders coincide with the longitudinal axes of the racks, respectively. A plurality of teeth are located in the confronting surfaces of the racks 68 and 69 as best seen in FIG. 8. The teeth in the racks coact with a pinion 71 mounted between a bifurcated extremity 72 of the carrier 70 for rotation around pin 73. On carrier 70 and in spaced relation to the pinion 71 are laterally extending safety stops or take-over lugs 74 and 75. The lugs 74 and 75 are adapted to coact with the ends of the racks 68 and 69 to move the racks and their abutting pistons into the cylinders when there is a substantial pressure difference therebetween. In the preferred embodiment, the lugs 74 and 75 coact with complimentary recesses 76 and 77, respectively, located in the confronting surfaces of the racks 68 and 69, respectively, adjacent the racks free extremity. The recesses having the stops therein, keep the racks aligned and keep the racks from being tilted as force is brought to bear upon them. The brake rod 20 is socketed to the carrier 70 at its extremity adjacent the lugs 74 and 75. The gap 82 between the end 72 of the carrier 70 and the rear plate 81 of the housing 22 is the limit of travel of the carrier 70 which will abut against plate 81 if the resistance in each cylinder falls to atmospheric pressure, e.g. when both lines 15 and 12 are ruptured. In such event, the foot pedal will be on the floor. This travel limit also prevents damage to either of the valves 63 at the outlet extremity of cylinders 11 and 14.

It should be noted that recesses 76 and 77 may, in certain instances, be of different length. Where different size or diameter brake actuating cylinders are used in front from what are used in the rear, for example, 1⅛″ in front and 15/16″ in the rear, the piston feeding the larger diameter cylinders will tend to move faster than the piston feeding the smaller diameter cylinders and thus "lead" the latter. To compensate for this differential movement of the pistons due to volumetric differences, the spaces 80 and 80a between the lugs 74 and 75 and their respective racks 69 and 68 will be different, so that when both front and rear brakes are under full fluid pressure, the gap 80 FIG. 3 between lug 75 and rack 69 will be about equal to the gap 80a (FIG. 3) between lug 74 and rack 68. When the cylinder diameters are the same front and back, the gaps 80 and 80a are equal when there is no pressure applied to the fluid in the master cylinders 11 and 14.

In operation the pinion carrier 70 is moved in a fluid pressurizing direction in response to movement of brake pedal 19 by the brake push rod or pitman 20. When the brake pedal 19 is depressed, the pinion carrier 70 moves in a direction towards the cylinders. The teeth of the pinion 71 are engaged with the teeth of the racks 68 and 69, and as the carrier with attached pinion moves forward toward the cylinders, the racks 68 and 29 also move toward the cylinder. Pinion 71 may be a circular gear or have diametrically disposed teeth partially around its circumference as shown in FIG. 3. Since the racks 68 and 69 abut the pistons 54 and 55, respectively, as the racks move forward the pistons are forced into the master cylinders 11 and 14, and exert pressure on the fluid in each of the isolated hydraulic sub-systems. The fluid is forced from the cylinder into the brake lines, for example, brake lines 12 and 15 into the brake assemblies 10 and 13, respectively, to initiate braking action. If there is a slight differential in the fluid pressure in the cylinders 11 and 14, the pinion will so rotate as to permit the rack abutting the piston located in the cylinder of the lower pressure to move relative to the other rack which forces the piston abutting it, to exert more pressure on the fluid thus equalizing the pressures in the lines to permit even braking. The distance which the rack coacting with the piston having less fluid resistance travels is twice the distance which the brake rod 20 travels, thus conserving pedal travel and providing quick equalizing response. The pinion is so designed as to provide only a limited relative movement between the racks. In cases where there is substantial pressure difference in the cylinders 11 and 14, i.e. one sub-system including a line open to the atmosphere, the same relative movement between the racks will take place, except that after the carrier 70 has moved the short relative distance 80 allowed by the rotating pinion, a safety take over lug will strike the back edge of the rack abutting the piston in the cylinder wherein the pressure is greater, and the rack is carried along with the carrier 70. Thus the full push rod force is then directly applied against the piston to effect a positive braking action. In extreme cases like this, at least one piston in one of the master cylinders will provide increased pressure to induce braking action in the remaining operative system of the front or rear brake sub-systems.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. In a hydraulic fluid system having a plurality of isolated hydraulic sub-systems each including a master cylinder and at least one auxiliary cylinder, hydraulic fluid supply means for supplying each of said hydraulic sub-systems and a piston coacting in each of said master cylinders for feeding fluid from said supply means; means for driving said pistons in a fluid pressurizing direction including a single force applying control member, driving racks coacting with each of said pistons, a rotatable pinion coacting between said racks and said control member for differentially driving said racks in response to the resistance offered by each piston whereby the pressure in each cylinder is substantially equalized, said control member also including non-rotatable take-over means for engaging said racks, said take-over means being normally disengaged from said racks and adapted to take over and drive at least one of said racks when the resistance offered by another of said racks falls below a predetermined value.

2. A dual braking hydraulic system comprising:
  (a) a pair of cylinders in spaced relation;
  (b) pistons movable in the cylinders;
  (c) a rack having teeth therein, abutting each piston and slidable therewith for exerting pressure thereagainst, the teeth being disposed in confronting surfaces of the racks;
  (d) means coacting between the teeth of the racks for differentially moving the racks in a direction towards the cylinders whereby the pistons are moved in their respective cylinders; and
  (e) non-rotatable take over means disposed on said rack moving-means for engagement with said racks to take over and drive at least one of said racks when the resistance offered by another of said racks falls below a predetermined value.

3. The system of claim 2, wherein the cylinders are in parallel spaced relation and lie substantially in the same plane.

4. The system of claim 2, which includes means for supplying fluid to the cylinders.

5. The system of claim 2, which includes a fluid reservoir divided into two compartments, one compartment mounted atop each cylinder and in communication therewith, the compartments being adjacently disposed in a unitary housing for simplicity of construction, and each compartment having an air chamber and means for supplying air thereto.

6. The system of claim 5, which includes means for supplying fluid, under pressure, from each master cylinder through a brake line to a brake actuating cylinder.

7. The system of claim 6, which includes means for bleeding air from each brake line, said means including a separate line connecting each brake line adjacent the cylinder connected thereto, with the compartment of the reservoir in communication with said cylinder, said bleeder lines having at their extremities in the reservoir, a valve which when opened, permits air and fluid to be bled from the system.

8. The system of claim 4, wherein the means for differentially moving the racks includes a pinion carrier disposed between the racks and slidable therewith, a pinion rotatably mounted to the carrier for engagement with the teeth of the racks to move the racks and abutting pistons in their respective cylinders in unison, and, when unequal pressure exists in the cylinders, to permit further limited movement of the piston in the cylinder wherein the pressure is lower relative to the other piston.

9. A dual braking system comprising:
  (a) a pair of cylinders substantially disposed in the same plane in parallel spaced relation;
  (b) a fluid reservoir mounted on each cylinder and in communication therewith, the reservoirs being adjacently disposed in a housing integral with the cylinders for unitary construction, and having at their extremities furthest from the cylinders, removable individual air chambers and means for supplying air thereto;
  (c) pistons movable in the cylinders each piston being spring biased in a fluid pressure relieving direction within the cylinder;
  (d) a rack abutting each piston and slidable therewith, for exerting pressure against the piston to move it in the cylinder against the spring and the fluid, the racks having teeth in their confronting surfaces;
  (e) a pinion mounted on a carrier slidable between the racks, the pinion engaged with the teeth of the opposing racks to move the racks and abutting pistons in their respective cylinders in unison, and when unequal pressure exists in the cylinders to permit further limited movement of the piston in the cylinder wherein the pressure is lower relative to the other piston, the carrier having in spaced relation from the pinion, a pair of oppositely disposed outstanding safety stops for direct pushing engagement with the ends of the racks as the carrier moves towards the cylinders when a substantial pressure differential exists between the master cylinders, the safety stop engaging the end of the rack abutting the piston movable in the cylinder wherein the pressure is greater, and the carrier having at its other end means for seating a brake rod;
  (f) a brake line connected to each master cylinder for supplying fluid under pressure to a brake actuating cylinder; and
  (g) means for bleeding air from the brake lines including a line connecting each brake line adjacent the cylinder in communication therewith with the reservoir mounted atop said cylinder, each bleeder line having at its extremity in the reservoir, a valve, which when opened, permits air to be bled from the master cylinder.

10. In a dual braking system having a pair of cylinders with a piston slidable in each cylinder, and a fluid reservoir in communication with the cylinders, and a brake line connected to each cylinder, a brake equalizer comprising:
  (a) a rack having engaging means abutting each piston and slidable therewith;
  (b) a carrier between the racks and slidable therewith, said carrier designed to engage the engaging means of the racks to move them in unison and relative to each other when a slight fluid pressure differential exists in the cylinders, the carrier having at one extremity, a pair of oppositely disposed, outstanding safety stops for pushing engagement with the racks when a substantial fluid pressure differential exists in the cylinders.

11. In a dual hydraulic braking system having a pair of cylinders with pistons slidable therein, a brake equalizer comprising:
  (a) a rack abutting each piston for imparting movement thereto, the racks having teeth in their confronting surfaces; and
  (b) a carrier between the racks and slidable therewith, the carrier having rotatably mounted thereto, a pinion engaged with the teeth of the racks to differentially move the racks, the carrier having in spaced relation from the pinion, a pair of outstanding, oppositely disposed stops for direct pushing coaction against the ends of the racks.

12. The system of claim 9, wherein the take over means includes a pair of oppositely disposed safety stops disposed on the carrier in spaced relation from the pinion, for pushing engagement with the racks as the carrier moves towards the cylinders when substantial pressure difference exists in the cylinders, one of the safety stops engaging the rack abutting the piston movable in the cylinder wherein the pressure is greater.

13. In a fluid braking system having a pair of cylinders and pistons movable therein, a toothed rack abutting each piston and slidable therewith, and means coacting between the teeth of the racks for differentially moving the racks in a direction towards the cylinders, the improvement which comprises non-rotatable take over means disposed on said rack moving means for engagement with said racks to take over and drive at least one of said racks when the resistance offered by another of said racks falls below a predetermined value.

14. An actuator for a hydraulic fluid system having a pair of independent hydraulic sub-systems, said actuator composing in combination:
  (a) a pair of master cylinders in side-by-side relation, each of said master cylinders being operative in but one of said sub-systems;
  (b) hydraulic fluid supply means for supplying each of said hydraulic sub-systems;
  (c) a piston reciprocable in each of said master cylinders for moving hydraulic fluid in each of said hydraulic sub-systems;
  (d) a piston actuating control member disposed between said pistons;
  (e) means coacting between each of the pistons and said control member for differentially driving said pistons in a fluid pressurizing direction, and in response to the individual hydraulic resistance pressure against which each of said piston is driven; and
  (f) separate non-differentiating non-rotatable take over driving means disposed for coaction between the control member and said pistons for directly driving one of said pistons in a fluid pressurizing direction when the hydraulic resistance pressure against which the other of said pistons operates falls below a predetermined value, said take over means being normally disengaged and engagable by relative axial movement between said control member and the piston to be directly driven.

15. An actuator in accordance with claim 14 wherein said take over means includes intercepting shoulder means coacting between the pistons and said control member.

16. An actuator in accordance with claim 15 wherein the shoulder means includes lateral shoulders on said control member disposed to intercept seat means for said shoulders on each of the pistons.

17. A fluid braking system comprising in combination a pair of cylinders having pistons longitudinally movable therein; means for differentially driving said pistons in said cylinders in response to the resistance against which such pistons move; non-rotatable take over means operable independently of said differentially driving means for selectively directly driving each of said pistons independently of said differentially driving means, said take over means being normally disengaged from said pistons and adapted for engagement with said pistons to take over and drive at least one of said pistons when the resistance offered by the other of said pistons falls below a predetermined value.

References Cited
UNITED STATES PATENTS

| | | | |
|---|---|---|---|
| 1,055,471 | 3/1913 | Kaunitz | 188—204 |
| 1,453,098 | 4/1923 | Frock | 188—152.02 |
| 1,985,812 | 12/1934 | Banas | 60—54.5 |
| 2,062,167 | 11/1936 | Deiter. | |
| 2,074,718 | 3/1937 | Bohannan. | |
| 2,080,687 | 5/1937 | Bowen | 60—54.5 |
| 2,131,459 | 9/1938 | Weatherhead. | |
| 2,181,626 | 11/1939 | Nicol | 188—204 |
| 2,285,557 | 6/1942 | Berglund | 60—54.5 |
| 2,319,368 | 5/1943 | Schnell. | |
| 2,375,415 | 5/1945 | Hollowell. | |
| 2,524,544 | 10/1950 | Seawell | 60—54.5 |
| 2,559,850 | 7/1951 | Davis. | |
| 2,596,119 | 5/1952 | Blackman. | |
| 2,789,578 | 4/1957 | Goepfrich | 137—493.1 |
| 2,995,218 | 8/1961 | Penrod. | |
| 3,021,677 | 2/1962 | Miller | 60—54.6 |
| 3,037,522 | 6/1962 | Millan | 137—493.2 |
| 3,067,842 | 12/1962 | Smith. | |
| 3,113,433 | 12/1963 | Kohlman | 60—54.6 |

MARTIN P. SCHWADRON, *Primary Examiner.*
ROBERT R. BUNEVICH, *Examiner.*